United States Patent [19]

Naitoh et al.

[11] Patent Number: 4,575,916

[45] Date of Patent: Mar. 18, 1986

[54] METHOD FOR PREPARING A SEAT BELT BUCKLE MECHANISM

[75] Inventors: Katsumi Naitoh, Kanagawa; Tadaaki Shimamura, Saitama, both of Japan

[73] Assignee: NSK Warner K.K., Japan

[21] Appl. No.: 710,658

[22] Filed: Feb. 15, 1985

Related U.S. Application Data

[62] Division of Ser. No. 406,451, Aug. 9, 1982, abandoned.

[30] Foreign Application Priority Data

Aug. 22, 1981 [JP] Japan .......................... 56-124433[U]

[51] Int. Cl.[4] ...................... B21D 39/00; B23P 11/00
[52] U.S. Cl. .................................. 29/517; 29/526 R; 24/581; 403/284
[58] Field of Search .................... 29/517, 525, 526 R; 403/284, 283, 274; 24/581

[56] References Cited

U.S. PATENT DOCUMENTS

| 2,151,032 | 3/1939 | Jensen | 29/517 |
| 2,209,673 | 7/1940 | Bratz | 24/114.5 |
| 3,901,610 | 8/1975 | Mason | 403/274 X |
| 4,065,836 | 1/1978 | Stephenson | 24/642 |
| 4,071,929 | 2/1978 | Loomba | 24/703 |
| 4,299,510 | 11/1981 | Emmerich et al. | 403/282 |
| 4,373,830 | 2/1983 | Ikesue | 403/284 |
| 4,402,114 | 2/1981 | Takagi | 29/517 UX |

FOREIGN PATENT DOCUMENTS 1935996  1/1970  Fed. Rep. of Germany ........ 29/517
1408499 10/1975  United Kingdom .

Primary Examiner—Charlie T. Moon
Attorney, Agent, or Firm—Wegner & Bretschneider

[57] ABSTRACT

A method for making a buckle mechanism starting with a cylindrical metal blank by forming a circumferential cut-out on the blank, fixing the blank onto a flexible cable, forming a flattened longitudinal groove on opposite sides of the blank by pressing on both sides, and inserting the thus-formed connector into a buckle base.

5 Claims, 8 Drawing Figures

METHOD FOR PREPARING A SEAT BELT BUCKLE MECHANISM

This application is a division of application Ser. No. 406,451, filed Aug. 9, 1982 now abandoned.

BACKGROUND OF THE INVENTION

The present invention relates to a blank material for a connector, designed for use in attachment of a buckle mechanism to the end of a flexible cable in a safety seat belt.

Referring to FIGS. 2 and 3, when a conventional blank material for a connector 2' is pressed into the form of a connector 2 in a single step, excessive forces are applied to the wires forming a flexible cable due to its cylindrical form. That is, since the blank material 2' is pressed into a hexagonal shape with formation of vertical grooves, flattened portion and so on, excessive external forces are applied to the portion hatched which is in FIG. 4, including the vertical grooves 23, 25 and the flattened portion 24. Such external forces then concentrate upon four of the wires 1' forming the flexible cable 1, as best shown in FIG. 5. As a result, those four wires are finely cracked, leading to a lowering of their tensile strength.

SUMMARY OF THE INVENTION

A main object of the present invention is, therefore, to provide a solution to the above-mentioned problem by the provision of a blank material for a connector comprising a cylindrical metal material having a cut-out around its central portion.

BRIEF DESCRIPTION OF THE DRAWINGS

The above-mentioned and other objects and features of the present invention will now become apparent form a reading of the following detailed description with reference to the accompanying drawings, in which.

PREFERRED EMBODIMENT OF THE INVENTION

For a better understanding of the present invention, reference will first be made to one typical example of a safety seat belt and the buckle mechanism used therewith. The buckle mechanism is disclosed in, e.g., British Pat. No. 1,408,499 and U.S. Pat. No. 4,373,830.

Figure 1:
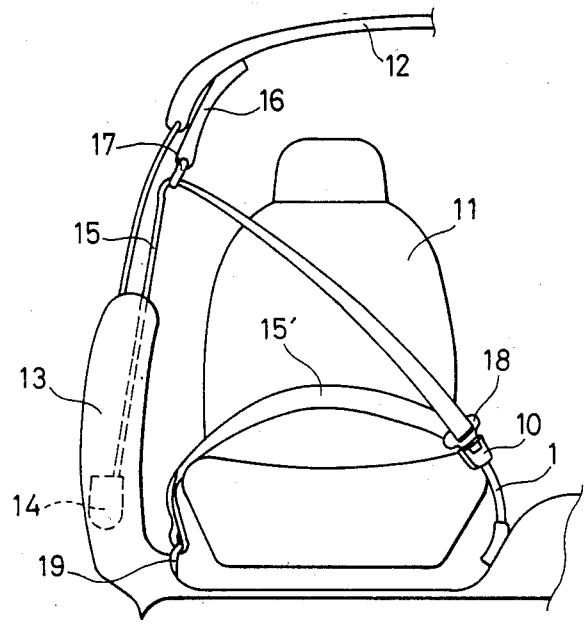
FIG. 1 is a view illustrative of a safety seat belt system.

Referring to the drawings, particularly to FIG. 1, there is shown a seat belt system into which is incorporated a buckle mechanism generally shown at 10. The buckle mechanism 10 is mounted on one end of a flexible cable 1 secured at the other end to the floor of a vehicle framework. Reference numerals 11 and 12 stand for a seat and a roof of the vehicle, respectively. As a webbing 15 is drawn out of a retractor 14 disposed in the interior of the framework, it passes through a through-ring 17 of a through-belt 16 mounted on the roof 12 and a tongue 18 provided halfway, and is fixed to the framework by means of suitable mounting means 19 placed on the floor.

In wearing, the webbing is brought in close contact with the occupant's body by the insertion of the tongue 18 into the buckle mechanism 10.

While the seat belt illustrated is of a so-called three-point type seat belt system wherein the upper and lower halves of the occupant are simultaneously held in place, it should be noted that a so-called two-part type seat belt system comprising only a webbing portion shown at 15', which is designed to hold only the lower half of the occupant in place, is used as well by the insertion of the tongue 18 provided at the end of the webbing into the buckle mechanism 10.

Figure 2:
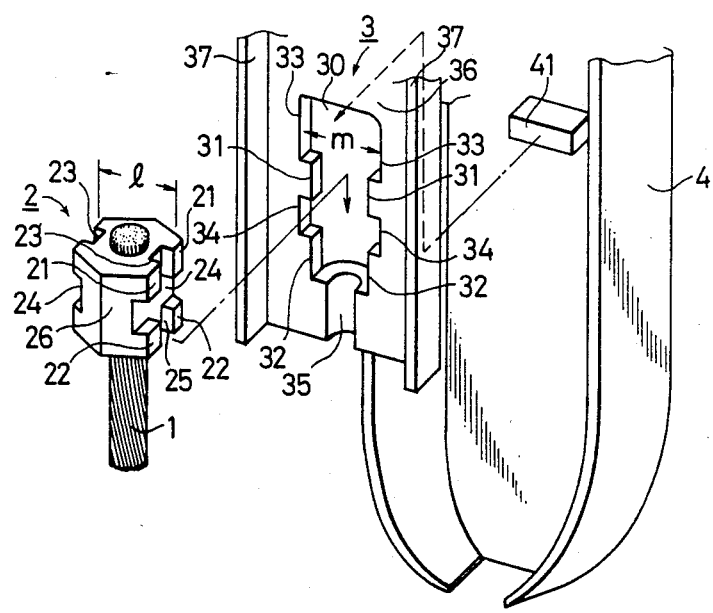
FIG. 2 is a perspective view showing a buckle mechanism with the parts being separated.

In FIG. 2, the buckle mechanism 10 is illustrated with the parts being separated. As shown, the buckle mechanism 10 comprises a flexible cable 1, a connector 2 secured to the end thereof, a buckle base 3 including a back plate 36 having therein a hole 30, and a buckle cover 4.

Figure 3:
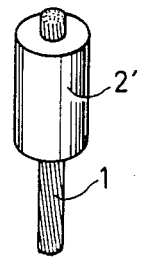
FIG. 3 is a view illustrative of the connector blank fitted onto a flexible cable.
Figure 4:
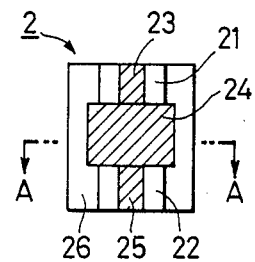
FIG. 4 is a side view of the connector shown in FIG. 2 with a portion hatched for illustrative clarity.
Figure 5:
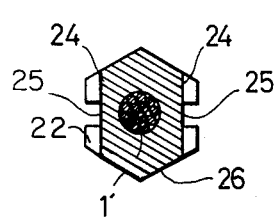
FIG. 5 is a sectional view taken along A—A of FIG. 4; and turned 90°.

In manufacturing the buckle mechanism, a blank material for the connector 2' in the cylindrical form is first squeezed over the end of the flexible cable, as shown in FIG. 3. The blank material 2' is then subjected to pressing on both its sides, so that a vertical groove 23 is squeezed between the upper flat faces 21 and 21 on both sides of the connector 2, as seen from FIG. 2. Both walls of the groove 23 are depressed at its lower central portion to form a flattened portion 24. In a similar way, a vertical groove 25 is formed between the lower right and left flat faces 22 and 22. Since the connector 2 is thus subjected to pressing from the right and left sides, it is tightly held over the flexible cable so that the cable swells in the direction of a portion shown at 26.

The buckle base 3, to which the connector 2 is to be attached, comprises a back plate 36 and plates 37, 37 provided on either side thereof, said back plate being provided therein with a hole 30 through which the connector is attached.

The hole 30 has projections 31, 31 and similar projections 32, 32 at its lower end. Below the hole 30 there is a semi-circular portion 35 for receiving the flexible cable 1. The dimensions of the projections 32, 31 may be substantially equal to, or slightly larger than, the depth of the vertical grooves 23, 25, as depicted in FIG. 2. The width m of the hole 30, viz., the interval between the right and left walls 33 above the projections 31 or between the walls 34 and 34 located between the projections 31 and 32 is slightly smaller than the distance (shown by l in FIG. 2) between the connector face 21 and the opposite face. The width of the vertical grooves 23 or 25 is substantially equal to the thickness of the back plate 36 forming a part of the buckle base.

In order to assemble the connector 2 to the buckle base 3, the connector 2 is first inserted at its upper flat faces 21 between the walls 33 and 33 of the hole 30 formed in the buckle base 3. The connector 2 is then inserted at the flattened portion 24 and the flat faces 22 between the projections 31 and 31 and between the walls 34 and 34, respectively, so that the vertical groove 23 or 25 is locted above the projections 31 or 32. The flexible cable 1 is placed in the semi-circular portion 35.

Upon the application of a pull to the connector 2 in the downward direction in the drawing (viz., in the direction of the semi-circular portion 35), the vertical grooves 23 and 25 take abutment onto the projections 31 and 32, so that the connector 2 is secured to the buckle base 3. Fitting of the buckle cover 4 over the buckle base 3 then results in accomplishment of the buckle mechanism 10. As illustrated in FIG. 2, the buckle cover 4 is provided on its rear side with a projection 41 designed to be fitted into the uppermost portion of the hole 30 for preventing disengagement of the connector or the like.

In general, the present invention has for its object to obviate the drawback of the prior art described in the preamble of the specification by reducing the thickness of the portion of the blank material for the connector corresponding to the flattened portion 24 in the preparation of the said blank material.

One preferred embodiment of the connector blank according to the present invention will now be explained.

Figure 6:
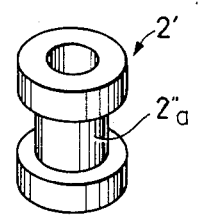
FIG. 6 is a view illustrative of one embodiment of the connector blank according to the present invention.

Referring to FIG. 6, a cut-out 2a is formed around the outside of the central portion of the blank material 2'. The width of the cut-out 2a is preferably larger than that of each projection 31 of the buckle base. The thus reduced thickness of the portion of the connector blank corresponding to the flattened portion 24 permits external forces to be uniformly applied to the wires 1', when the flexible cable 1 is squeezed into the blank material 2', so that no cracking of the wires takes place.

Figure 7:
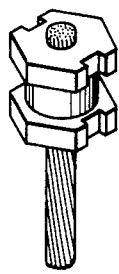
FIG. 7 is a view showing the pressed blank.

FIG. 7 shows the pressed blank material.

Figure 8:
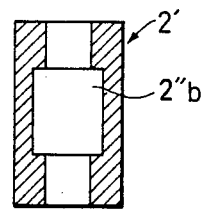
FIG. 8 is a view showing another embodiment of the connector blank according to the present invention.

According to another embodiment of the present invention illustrated in FIG. 8, a similar cut-out 2b is formed around the inside of the central portion of the blank material 2'. This second embodiment is identical in the effect and action with the first embodiment.

What is claimed is:

1. A method for preparing a buckle mechanism comprising;
    forming a circumferential cut-out on a cylindrical tubular metal member;
    compressing said tubular metal member on the end of a flexible cable;
    forming a flattened longitudinal groove on opposite external sides of the metal member by pressing the metal member on both sides;
    inserting said compressed metal member into a hole provided in a buckle base and having a projection corresponding to the longitudinal groove such that the flattened portion receives the projection; and
    engaging the longitudinal groove of the metal member with the projection of the hole on the buckle base by applying pull to said connector.

2. A method for preparing the buckle mechanism as claimed in claim 1, in which the cut-out is formed on the outer wall of the metal member.

3. A method for preparing the buckle mechanism claimed in claim 1, in which the cut-out is an annular groove.

4. A method for preparing the buckle mechanism as claimed in claim 1, in which the cut-out is an annular groove formed on the outer wall of the metal member.

5. A method for preparing the buckle mechanism as claimed in claim 1, further comprising engaging a buckle cover, having a projection adapted to prevent removal of the metal member, with the combination of the metal member and the buckle base.

* * * * *

UNITED STATES PATENT AND TRADEMARK OFFICE
CERTIFICATE OF CORRECTION

PATENT NO. : 4,575,916
DATED : March 18, 1986
INVENTOR(S) : Katsumi Naitoh and Tadaaki Shimamura It is certified that error appears in the above-identified patent and that said Letters Patent are hereby corrected as shown below:

On the cover page, Item 21, change "710,658" to --701,658--

Signed and Sealed this

Sixteenth Day of September 1986

[SEAL]

Attest:

DONALD J. QUIGG

Attesting Officer

Commissioner of Patents and Trademarks